(12) United States Patent
Hainberger et al.

(10) Patent No.: US 7,477,446 B2
(45) Date of Patent: Jan. 13, 2009

(54) RAMAN AMPLIFICATION SYSTEM UTILIZING MODULATED SECOND-ORDER RAMAN PUMPING

(75) Inventors: Rainer Hainberger, Vienna (AT); Takafumi Terahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/530,049

(22) PCT Filed: Oct. 4, 2002

(86) PCT No.: PCT/JP02/10375

§ 371 (c)(1), (2), (4) Date: Sep. 21, 2005

(87) PCT Pub. No.: WO2004/032384

PCT Pub. Date: Apr. 15, 2004

(65) Prior Publication Data

US 2006/0050365 A1 Mar. 9, 2006

(51) Int. Cl.
*H04B 10/17* (2006.01)
*H04B 10/12* (2006.01)

(52) U.S. Cl. ...................................... 359/334
(58) Field of Classification Search .................. 359/334
See application file for complete search history.

(56) References Cited

U.S. PATENT DOCUMENTS

| | | | |
|---|---|---|---|
| 6,163,636 A | 12/2000 | Stentz et al. | |
| 6,456,426 B1 * | 9/2002 | Bolshtyansky et al. | 359/334 |
| 6,611,368 B1 | 8/2003 | Grant et al. | |
| 6,748,136 B2 | 6/2004 | Headley et al. | |
| 6,844,961 B2 * | 1/2005 | Odate et al. | 359/334 |
| 6,870,665 B2 * | 3/2005 | Krummrich | 359/334 |
| 7,133,192 B2 * | 11/2006 | Tanaka et al. | 359/334 |
| 2002/0021864 A1 * | 2/2002 | Emori et al. | 385/27 |
| 2003/0039438 A1 * | 2/2003 | Gertsvolf et al. | 385/27 |
| 2003/0076577 A1 * | 4/2003 | Dominic et al. | 359/334 |
| 2003/0081307 A1 * | 5/2003 | Fludger et al. | 359/334 |

FOREIGN PATENT DOCUMENTS

| | | |
|---|---|---|
| EP | 1022870 | 7/2000 |
| EP | 1148666 | 10/2001 |
| EP | 1298766 | 4/2003 |
| JP | 2000-214503 | 8/2000 |
| JP | 2002-006349 | 1/2002 |
| JP | 2003-295238 | 10/2003 |

OTHER PUBLICATIONS

L. Labrunie et al., "1.6 Terabit/s (160×10.66 Gbit/s) unrepeated transmission over 321 km using second order pumping distributed Raman amplification", OAA, 2001, pp. PD3-1~PD3-3.

(Continued)

*Primary Examiner*—Eric Bolda
(74) *Attorney, Agent, or Firm*—Staas & Halsey LLP

(57) ABSTRACT

Higher-order Raman pumping is combined with pump modulation in a Raman amplified optical communication system. First- and second-order Raman pumps are both modulated and launched in opposite direction to signals in an optical fiber. Relative timing of the pumps is controlled to optimize lateral signal power distribution along the fiber.

9 Claims, 19 Drawing Sheets

OTHER PUBLICATIONS

Karsten Rottwitt et al., "Transparent 80 km Bi-Directionally Pumped Distributed Raman Amplifier with second order pumping" ECOC'99, 26-30, Nice, France, Sep. 1999, pp. II-144~II-145.

Y. Hadjar et al., "Quantitative analysis of second order distributed Raman amplification", OFC 2002 Thb, Mar. 21, 2002, pp. 381-382.

S. B. Papernyi et al., "Third-Order Cascaded Raman Amplification", OFC 2002 Post deadline Papers, pp. FB-1~FB4-3.

C. R. S. Fludger et al., "Novel Ultra-broadband High Performance Distributed Raman Amplifier Employing Pump Modulation", OFC 2002 WB4, Mar. 20, 2002, pp. 183-184.

C. R. S. Fludger et al., "Pump to Signal RIN transfer in Raman Fiber Amplifiers", Journal of Light wave Technology, vol. 19, No. 8, Aug. 2001, pp. 1140-1148.

Japanese Patent Office Action, mailed Dec. 12, 2006, and issued in corresponding Japanese Patent Application No. 2004-541192.

* cited by examiner

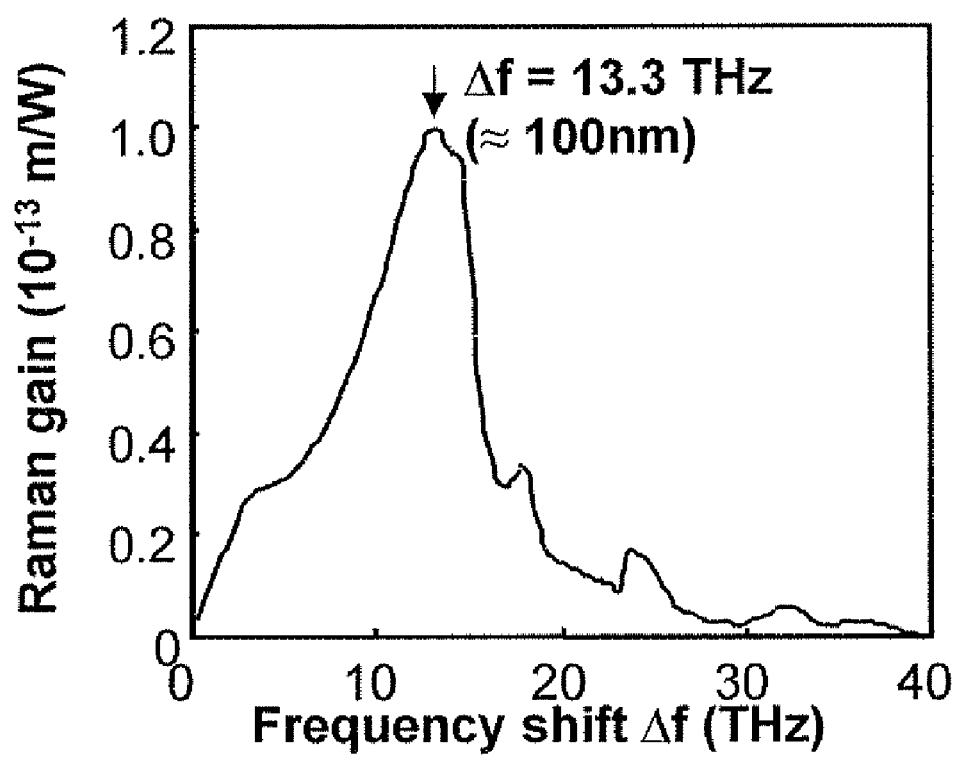
F I G. 1

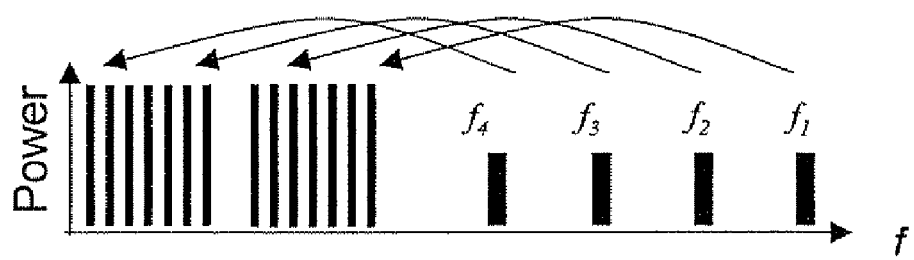
F I G. 4

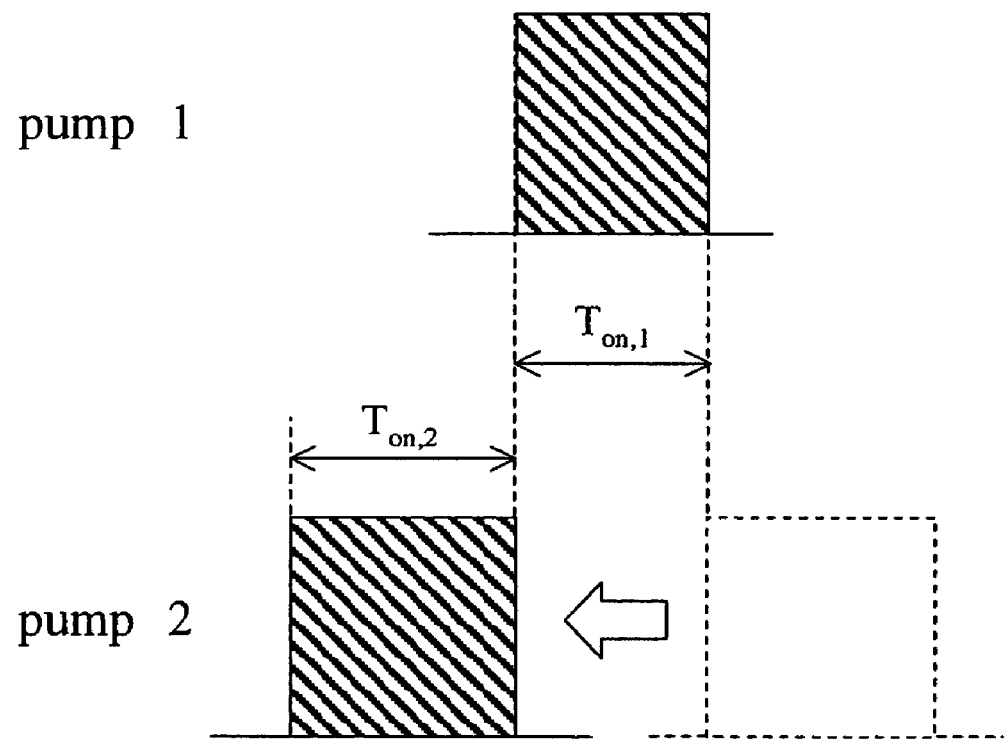
F I G. 1 3

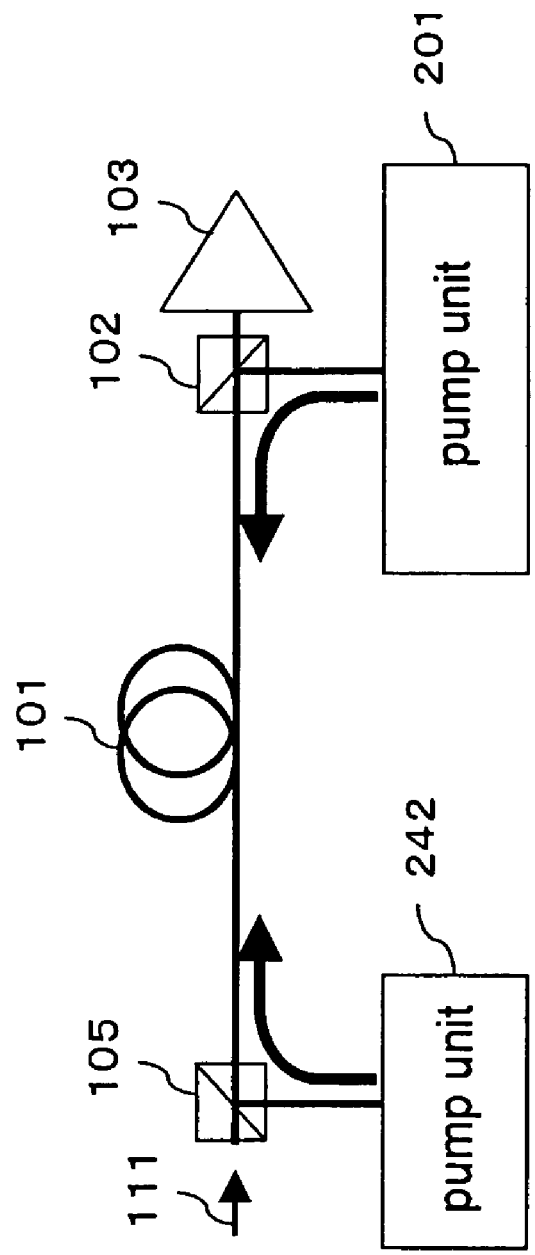
F I G. 1 7

RAMAN AMPLIFICATION SYSTEM UTILIZING MODULATED SECOND-ORDER RAMAN PUMPING

TECHNICAL FIELD

The present invention relates to a Raman amplified optical communication system utilizing higher-order Raman amplification with modulated Raman pumps.

BACKGROUND ART

State-of-the-art wavelength division multiplexed (WDM) optical fiber transmission systems employ distributed Raman amplification (DRA) in addition to discrete amplifiers. DRA partly compensates fiber losses along the transmission fiber and thus allows increasing the distance between discrete amplifiers. DRA is based on stimulated Raman scattering, an inelastic scattering process between photons and optical phonons in which optical power is transferred from shorter to longer wavelengths.

FIG. 1 shows a typical Raman gain profile (Raman gain spectrum). The maximum power transfer occurs between wavelengths separated by 13.3 THz (about 100 nm). Two pumping arrangements can be distinguished, as shown in FIG. 2 and FIG. 3.

FIG. 2 shows counter-directional pumping, where the pump light 112 propagates in opposite direction to the signal light (signal waves) 111 in a transmission fiber 101. In this case, a discrete amplifier 103 and a pump unit 104 are provided in a repeater unit on one side (output side) of the transmission fiber 101 and coupled to the transmission fiber 101 through an optical coupler 102. The pump unit 104 comprises a plurality of pump lasers of different wavelengths.

FIG. 3 shows co-directional pumping, where the pump light 113 propagates in the same direction as the signal light 111. In this case, a pump unit 106 is provided in a repeater unit on the other side (input side) of the transmission fiber 101 and coupled to the transmission fiber 101 through an optical coupler 105.

In state-of-the art systems, counter-propagation is commonly used in order to avoid the risk of pump-signal crosstalk.

Employing a plurality of pumps with different wavelengths and suitable power allows flattening the gain over a wide signal wavelength range as required in broadband WDM transmission systems (see Reference 1).

Reference 1

L. Labrunie et al., "1.6 Terabit/s (160×10.66 Gbit/s) unrepeatered transmission over 321 km using second order pumping distributed Raman amplification", OAA 2001 PD3.

FIG. 4 shows this principle schematically with a power spectrum for a C/L-band transmission system with four Raman pumps of different wavelengths (first-order multiple-wavelength Raman pumping). Pump light of frequencies $f_1$, $f_2$, $f_3$, and $f_4$ ($f_1 > f_2 > f_3 > f_4$) amplifies L-band and C-band signal waves with an appropriate gain over the signal wavelength range.

Since the Raman pumping efficiency is polarization sensitive it is necessary to use depolarized pump light in order to suppress polarization dependent gain. Depolarization can be achieved by multiplexing two waves with orthogonal polarization of the same or of slightly different frequencies $f_{p1}$, $f_{p2}$ given by $f_{p1} = f_p - \delta f_p$, $f_{p2} = f_p + \delta f_p$, where $\delta f_p$ is up to 0.35 THz. Later on, the term "pump" will be used for such pairs of multiplexed waves with slightly different frequencies and orthogonal polarization. As frequency of a depolarized pump the center frequency $f_p$ is used.

The group velocity $v_g$, i.e. the speed at which an optical pulse propagates through a fiber, is wavelength dependent. This phenomenon is known as group velocity dispersion or chromatic dispersion. FIG. 5 shows schematically the wavelength dependence of the group velocity of a standard single mode fiber (SMF). In the normal dispersion regime, the higher frequency components travel slower than the lower frequency components ($\lambda < \lambda_d$, $\beta_2 > 0$). Group velocity dispersion parameter $\beta_2$ is written as follows by using wavelength $\lambda$ ($\omega = 2\pi/\lambda$) and dispersion parameter D.

$$\beta_2 = \frac{d}{d\omega}\left(\frac{1}{v_g}\right) = -\frac{\lambda^2}{2\pi c}D \tag{1}$$

Chromatic dispersion causes pulse broadening because the individual spectral components of the pulse propagate at different speeds.

Recently, two new technologies have been introduced to further improve the performance of Raman amplified transmission systems: second- and third-order Raman pumping and Raman pump modulation.

Second order Raman pumping uses a second order pumps to amplify first order pumps along the transmission fiber. This makes the gain experienced by the signals more uniform along the fiber, which improves the noise figure. It has first been proposed with the first-order pump counter-propagating and the second-order pump co-propagating to the signals (see Reference 2).

Reference 2

K. Rottwitt et al., "Transparent 80 km bi-directionally pumped distributed Raman amplifier with second order pumping", European conference on optical communications 1999, vol. II, pp. 144-145.

Later, second-order Raman pumping with both the first- and second-order pumps counter-propagating to the signals has been demonstrated (see References 1 and 3).

Reference 3

Y. Hadjar et al., "Quantitative analysis of second order distributed Raman amplification", OFC 2002 ThB pp. 381-382.

Third-order Raman pumping has also been demonstrated (see Reference 4).

Reference 4

S. B. Papernyi et al., "Third-order cascaded Raman amplification", OFC 2002 postdeadline papers, FB4.

Fludger et al. proposed modulation and temporal separation of multi-wavelength Raman pumps as a means to suppress stimulated Raman scattering and four-wave mixing (FWM) among pumps (see Reference 5). Both effects degrade the performance of broadband WDM transmission systems.

Reference 5

C. R. S. Fludger et al., "Novel ultra-broadband high performance distributed Raman amplifier employing pump modulation", OFC 2002 WB4.

As Fludger et al. have pointed out, the modulation frequency of the Raman pump light should be in the order of a few 10 MHz to several 100 MHz. If the modulation frequency is too low, modulation transfer from the pumps to the signals occurs. On the other hand, if it is too high, the pump pulses are dispersed.

Since the Raman effect is practically instantaneous when compared to signal bit rates, modulation of the pump intensity will cause variations in the gain experienced by the signals. However, in counter-directional pumping scheme, the gain is averaged over the effective length of the transmission fiber such that any pump fluctuations above a few KHz are filtered. Further, modulation transfer from the pumps to the signals is negligible for the modulation frequency greater than a few MHz (see References 5 and 6).

Reference 6

C. R. S. Fludger et al., "Pump to signal RIN transfer in Raman fiber amplifiers", Journal of lightwave technology, Vol. 19, No. 8, pp. 1140-1148, August 2001.

DISCLOSURE OF INVENTION

It is an object of the present invention to provide an amplification system that allows further freedom in the control of the lateral signal power distribution (gain distribution) along the fiber.

The amplification system according to the present invention employs Raman amplification with a plurality of first-order Raman pumps and at least one second-order Raman pump which amplifies the first-order Raman pumps. The first- and second-order pumps counter-propagate to signal light in an optical fiber. The amplification system comprises a plurality of light sources and a modulator unit.

In the first aspect of the present invention, the light sources generate pump light of the first- and second-order pumps. The modulator unit modulates the pump light of the first- and second-order pumps by using relative timing of the first- and second-order pumps to optimize lateral signal power distribution along the optical fiber.

In the second aspect of the present invention, the light sources generate pump light of the first- and second-order pumps. The modulator unit modulates the pump light of the first- and second-order pumps by using relative timing of the first- and second-order pumps to allow flattening lateral signal power distribution along the optical fiber.

In the third aspect of the present invention, the light sources generate pump light of the first- and second-order pumps. The modulator unit modulates the pump light of the first- and second-order pumps by controlling a length of an interaction area in the optical fiber. In the interaction area pump power of modulated pulses of the second-order pump overlap with pump power of modulated pulses of the first-order pumps.

BRIEF DESCRIPTION OF DRAWINGS

FIG. 1 shows a Raman gain profile.

FIG. 4 shows principle of first-order multiple-wavelength Raman pumping.

FIG. 13 shows relationship between the first- and second-order pump pulses at the ending point of overlap.

FIG. 17 shows a pumping concept with forward third-order pumping.

BEST MODE FOR CARRYING OUT THE INVENTION

Figure 2:
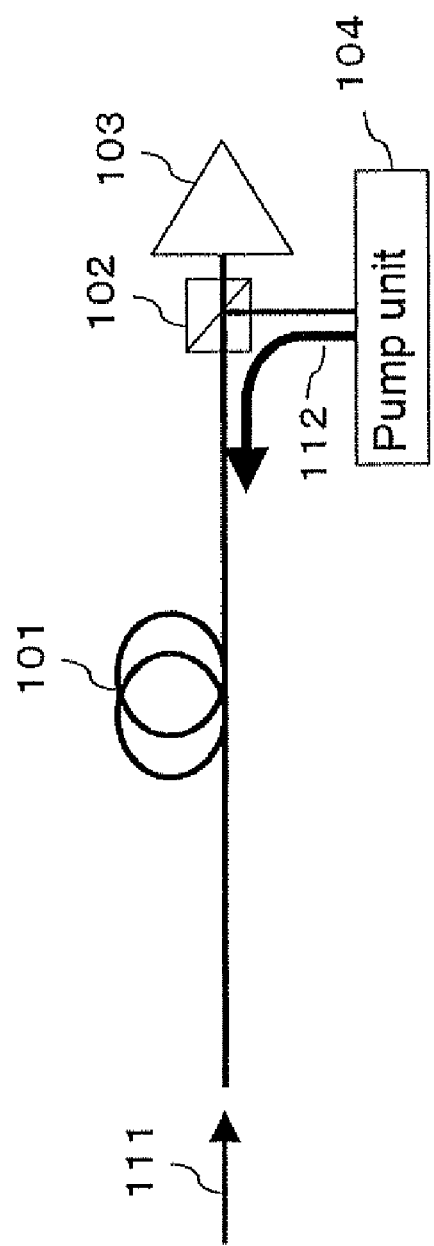
FIG. 2 shows counter-directional pumping.
Figure 3:
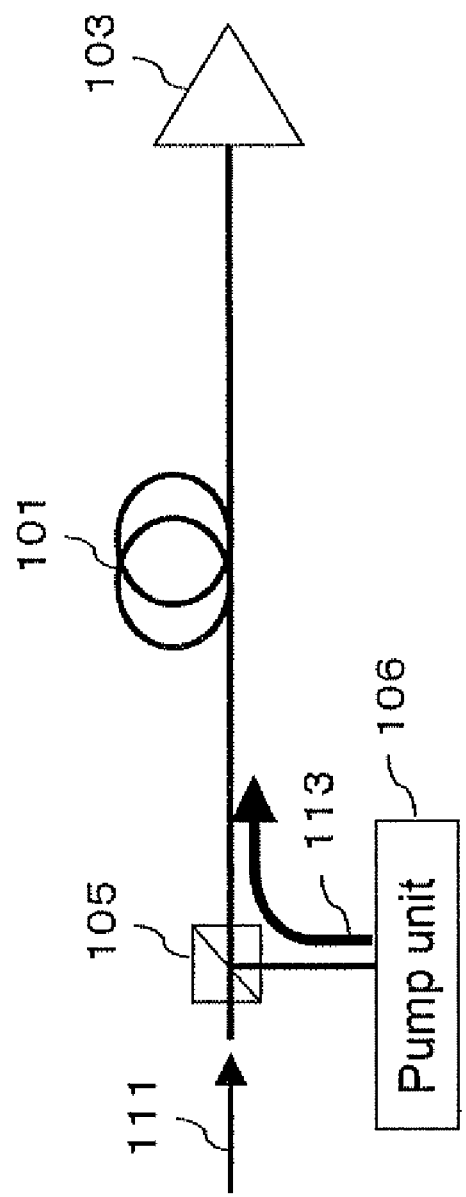
FIG. 3 shows co-directional pumping.
Figure 5:
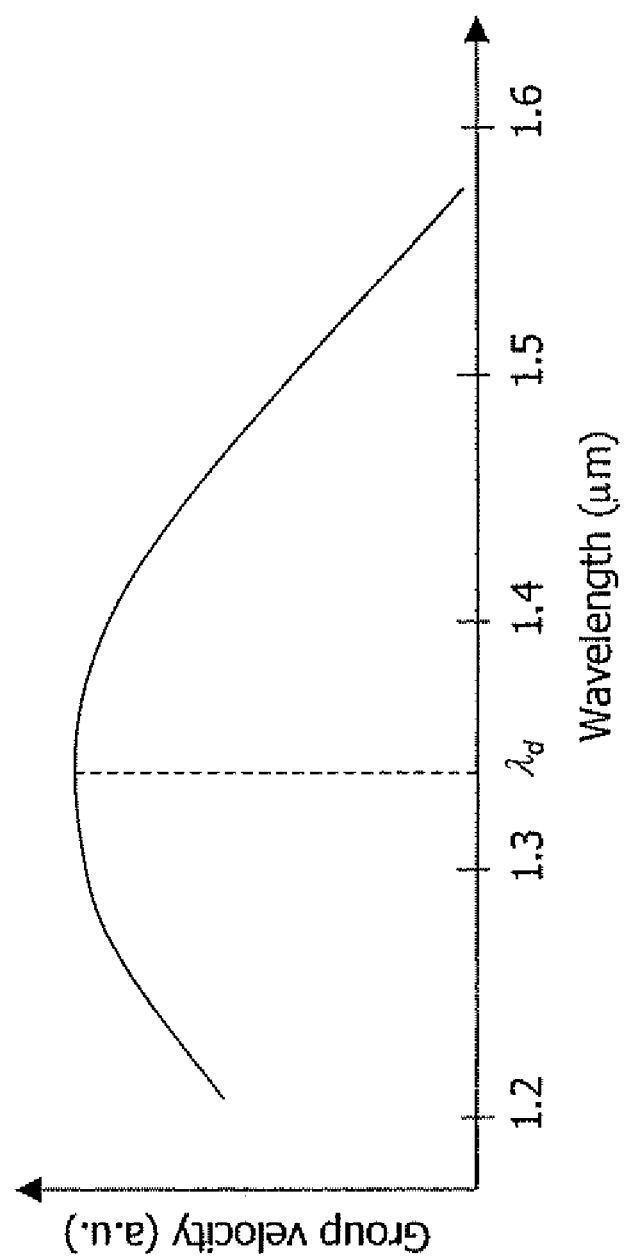
FIG. 5 shows group velocity dispersion in a standard single mode fiber.

Hereinafter, preferred embodiments according to the present invention will be described in detail by referring to the drawings.

In the preferred embodiments the techniques of second-order Raman pumping and pump modulation are combined. First- and second-order Raman pumps are both modulated and launched in opposite direction to the signals. Temporal offsetting of the first- and second-order Raman pumps prevents an interaction between the pumps close to the fiber end, where the launch power of the first-order Raman pumps is still high.

Figure 6:
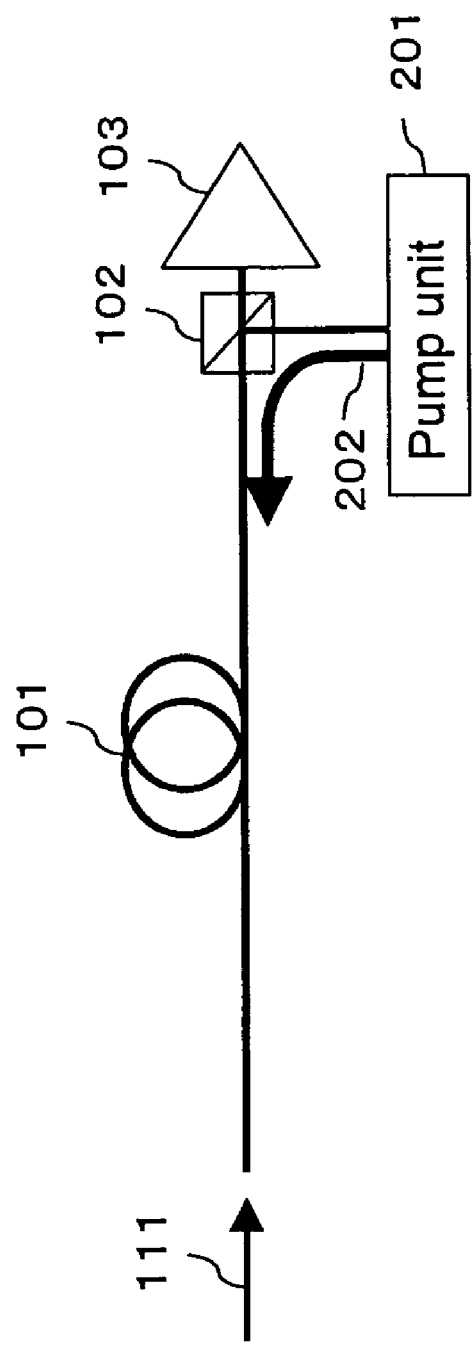
FIG. 6 shows the configuration of modulated first- and second-order Raman pumping.
Figure 7:
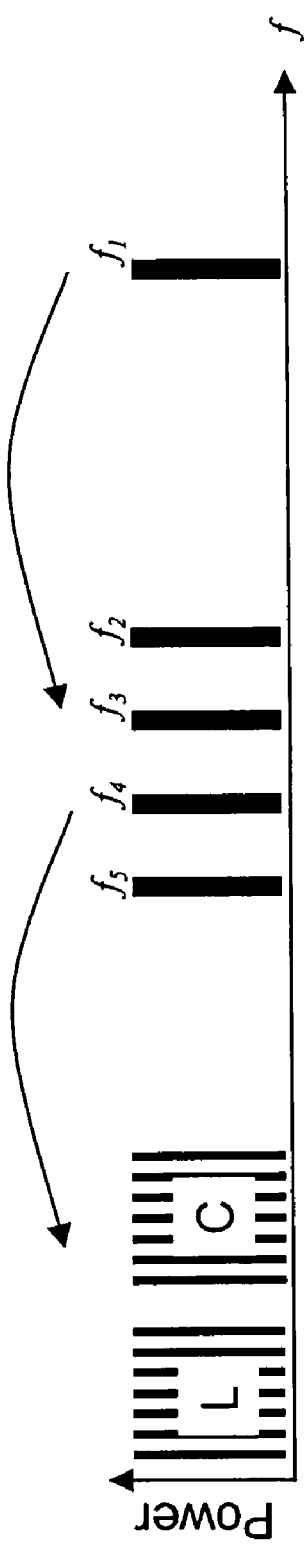
FIG. 7 shows the power spectrum of modulated first- and second-order Raman pumping.

FIG. 6 illustrates this concept for a C/L-band transmission system. The pump light 202 launched by the pump unit 201 comprises four first-order Raman pumps and one second-order Raman pump. The power spectrum of this system is as shown in FIG. 7. The first-order Raman pumps with frequencies $f_2$, $f_3$, $f_4$, and $f_5$ provide gain to the signal channels and the second-order Raman pump with frequency $f_1$ pumps the first order Raman pumps.

Figure 8:
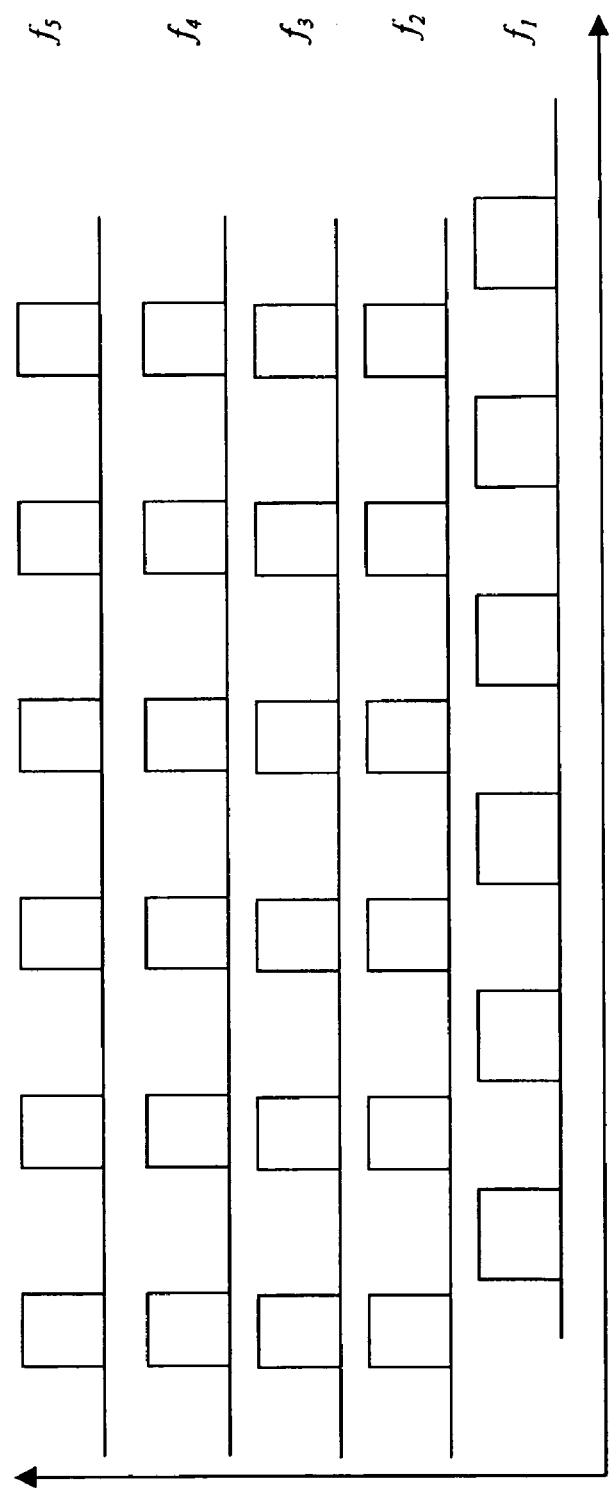
FIG. 8 shows modulation of first- and second-order Raman pumps.

The first-order Raman pumps are modulated in phase with a rectangular pulse as shown in FIG. 8, whereas the pulse train of the second-order pump is out of phase. The horizontal axis in FIG. 8 represents time and the height of each pulse represents power of the modulated pump. The temporal offset of a second-order pump pulse to a first-order pump pulse is determined such that they do not or partially overlap.

As the pumps penetrate deeper into the fiber, their power reduces due to absorption. However, because of the different group velocities the modulated first- and second-order pump pulses increasingly overlap resulting in a power transfer from the second- to the first-order pump and as a consequence, a higher gain experienced by the signal farther away from the fiber end (launching point of the pumps).

This amplification scheme can be represented by the words "remote amplification". "Remote amplification" of the first- and second-order pumps means that the overlap between the pumps reaches its maximum deeper in the fiber, thus pushing the power transfer from the second- to first-order pump deeper into the fiber. This effect is illustrated in FIG. 9.

Figure 9:
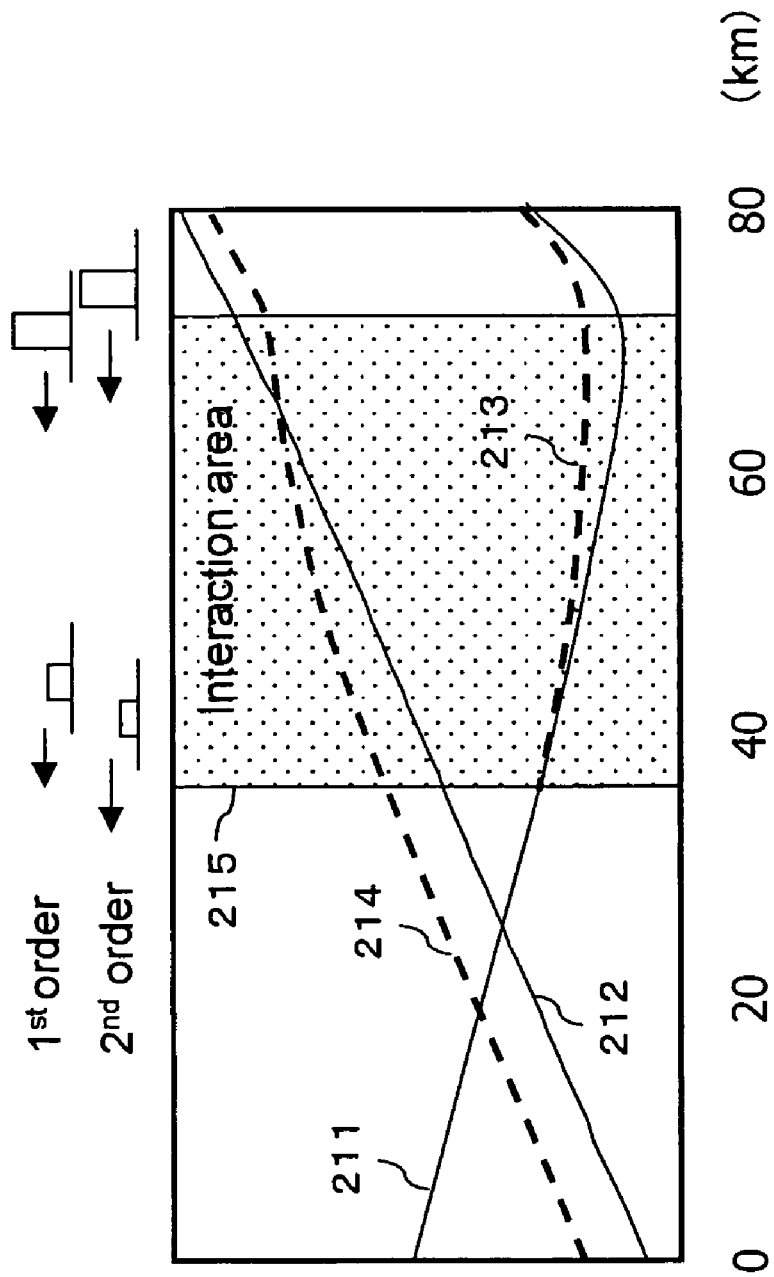
FIG. 9 shows impact of modulated second-order Raman pumping.

In FIG. 9, the second-order pump propagates faster than the first-order pumps. However, depending on the fiber type and the pump wavelength allocation, the opposite might be the case. The vertical axis represents power and the horizontal axis represents a distance from another fiber end (the launching point of signals) along the fiber.

The solid lines 211 and 212 indicate the power distribution of a signal and a first-order pump, respectively, without second-order pumping. The dashed lines 213 and 214 schematically show the impact of pulsed second-order pumping on the power distribution of the signal and the first-order pump, respectively. Interaction area 215 represents an area where the first- and second-order pump pulses overlap and an interaction occurs between the first- and second-order pumps.

In the case that the second-order pumping is utilized, the launch power of the first-order pump is reduced such that the resulting gain of the signals remains constant. The gain is shifted deeper into the fiber such that the signals do not drop to such low power levels as in the conventional pumping scheme, which increases the optical-signal to noise ratio.

Next, the relationship between the first- and second-order pump pulses is discussed. For ease of explanation, a first-order pump and the second-order pump are represented by pump 1 and 2, respectively and some parameters are introduced as follows.

$T_{on,i}$: time in which pump i is on during one cycle
$T_{off,i}$: time in which pump i is off during one cycle $$T_i = T_{on,i} + T_{off,i}$$

$1/T_i$: modulation frequency of pump i
$\Gamma_i = T_{on,i}/T_i$: duty cycle of pump i
$T_{offset,ij}$: temporal offset between pump i and j
$v_{gr,i}$: group velocity of pump i
$D = d(1/v_{gr})/d\lambda$: group velocity dispersion (D=17 ps/nm/km for SMF)

Figure 10:
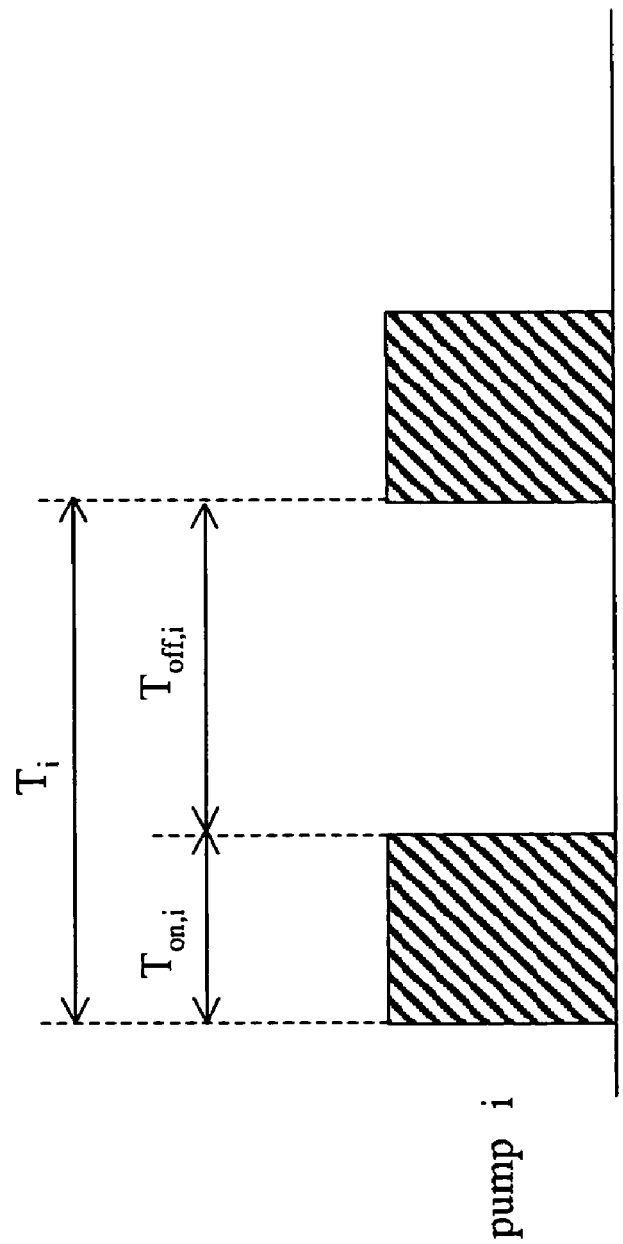
FIG. 10 shows relationship among pulse parameters of pump i.

The relationship among the parameters $T_i$, $T_{on,i}$ and $T_{off,i}$ is illustrated in FIG. 10. If the pulse cycle $T_2$ of pump 2 is set to match the pulse cycle $T_1$ of pump 1 and the cycle is represented by T, the maximum temporal offset between the pumps is written as follows.

$$T_{offset,12} = T - T_{on,2} = (1-\Gamma_2)T \quad (2)$$

Figure 11:
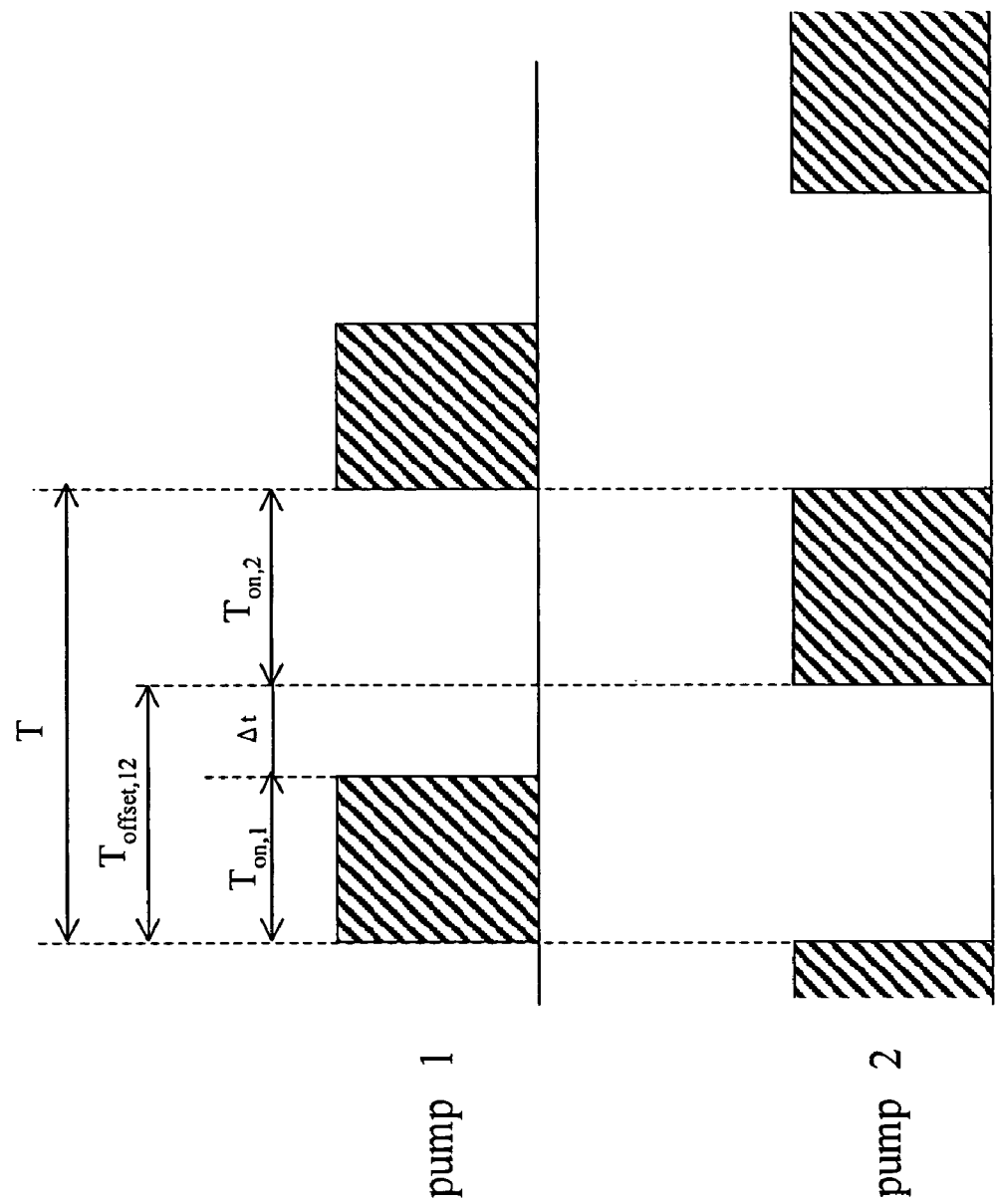
FIG. 11 shows the condition of the maximum temporal offset between pump 1 and 2.

This condition of the maximum temporal offset is shown in FIG. 11. The gap $\Delta t$ between the falling edge of the pump 1 pulse and the rising edge of the following pump 2 pulse is obtained as follows.

$$\Delta t = T_{offset,12} - T_{on,1} = (1-\Gamma_1-\Gamma_2)T \quad (3)$$

In a first approximation, the group velocities of the pumps are represented by the following expressions with $\lambda_0$, $\lambda_1$ and $\lambda_2$ as a reference wavelength, the wavelength of pump 1 and the wavelength of pump 2, respectively.

$$v_{gr,1} = 1/(1/v_{gr,0} + D(\lambda_1-\lambda_0)) \quad (4)$$

$$v_{gr,2} = 1/(1/v_{gr,0} + D(\lambda_2-\lambda_0)) \quad (5)$$

In equations (4) and (5), $v_{gr,0}$ represents the group velocity of the light with the reference wavelength $\lambda_0$. The difference of propagation time from the launching point $P_L$ of the pumps to a position $P_z$ along the fiber is obtained as follows, provided that L and z represent distances from the launching point of signals to the point $P_L$ and the position $P_z$, respectively.

$$(L-z)/v_{gr,1} - (L-z)/v_{gr,2} = (L-z)D(\lambda_1-\lambda_2) \quad (6)$$

In order to have the overlap of pulses shown in FIG. 11 start at $P_z$, $\Delta t$ has to match the difference of propagation time. From equations (3) and (6), the following equation is obtained.

$$(L-z)D(\lambda_1-\lambda_2) = (1-\Gamma_1-\Gamma_2)T \quad (7)$$

This is rewritten as the following condition for the starting position $P_z$ with $\kappa = T/(D(\lambda_1-\lambda_2))$ $$L-z = \kappa(1-\Gamma_1-\Gamma_2) \quad (8)$$

Figure 12:
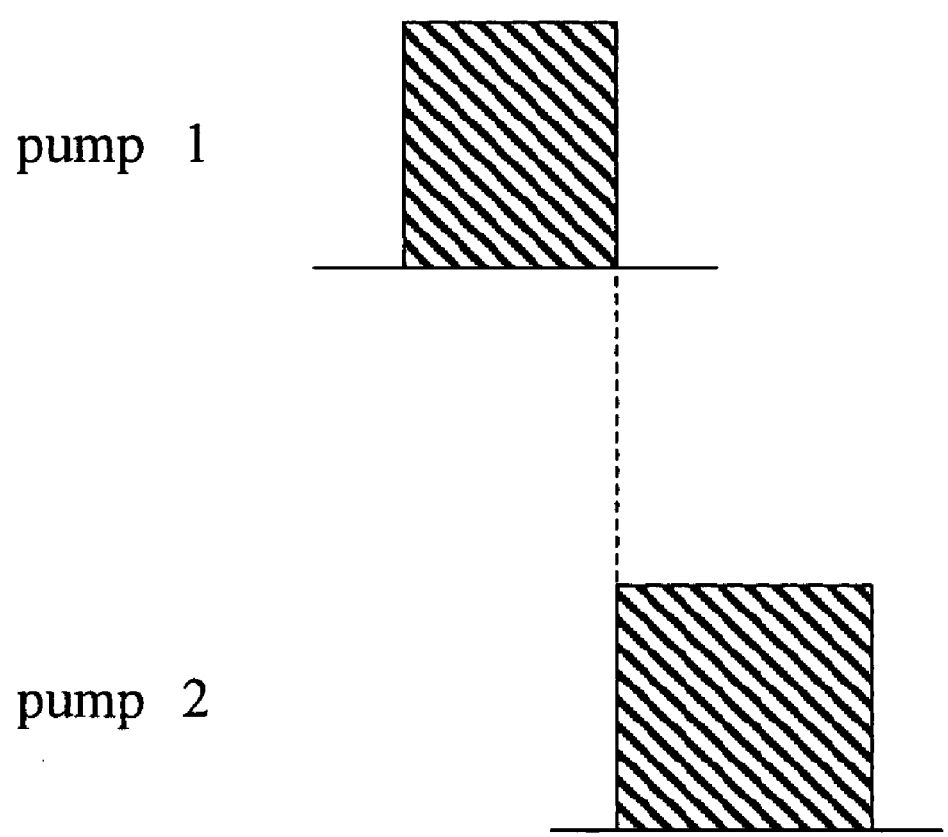
FIG. 12 shows relationship between the first- and second-order pump pulses at the starting point of overlap.

The interaction time is defined as a time from the start to end of the overlap. The relationship between the first- and second-order pump pulses at the starting and ending points of the overlap is shown in FIGS. 12 and 13, respectively. As is clear from FIG. 13, the interaction time is represented by the following expression.

$$T_{on,1} + T_{on,2} = (\Gamma_1+\Gamma_2)T \quad (9)$$

On the other hand, the interaction time is written by using the interaction length. The interaction length is the distance between the starting and ending points of the overlap and corresponds to the length of the interaction area 215 in FIG. 9. The interaction time is rewritten as follows with $\Delta z$ as the interaction length.

$$\Delta z/v_{gr,1} - \Delta z/v_{gr,2} = \Delta z D(\lambda_1-\lambda_2) \quad (10)$$

Assuming that the right side of equation (9) equals the right side of equation (10), $\Delta z$ is represented by the following expression.

$$\Delta z = (\Gamma_1+\Gamma_2)T/(D(\lambda_1-\lambda_2)) = \kappa(\Gamma_1+\Gamma_2) \quad (11)$$

From equation (11), it is verified that the interaction length can be controlled by adjusting the modulation frequency (1/T) and duty cycles ($\Gamma_1$ and $\Gamma_2$). An optimum overall performance of the system, such as flattening gain distribution along the fiber, is achieved by choosing an appropriate interaction length.

More generally, the modulation frequencies for the first- and second-order pumps do not always need to be the same, and the temporal offset between them is also adjustable. Further, two or more second-order pumps with arbitrary temporal offsets can be used. Therefore, the modulation frequencies, the duty cycles and the temporal offsets of first- and second-order Raman pumps can be adjusted as the relative timing of the pumps in order to achieve an interaction length for an optimum overall performance. Compared to continuous wave second-order pumping this method adds freedom in adjusting the signal power distribution along the fiber.

The pump sources are modulated either directly (electrically) through the driving current or optically using an electro-optical modulator.

Figure 14:
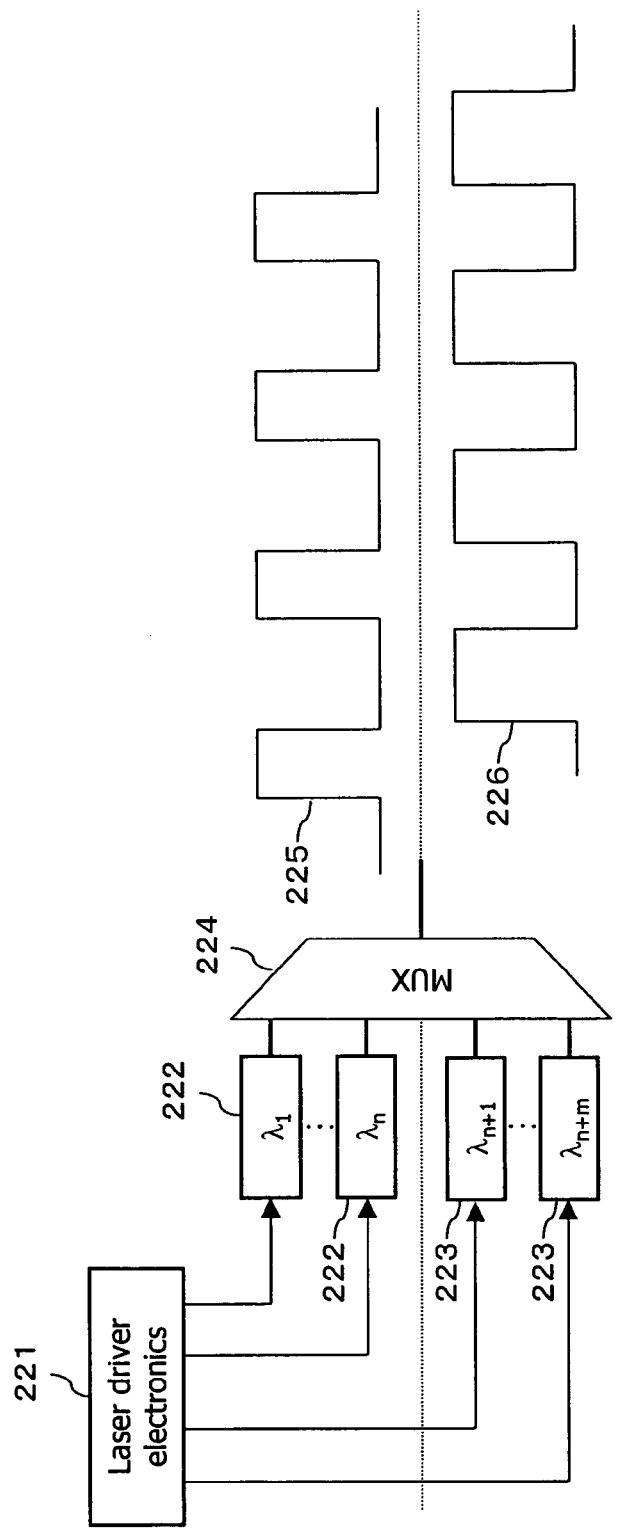
FIG. 14 shows the configuration of a pump unit employing electrical modulation.

FIG. 14 shows the configuration of a pump unit employing electrical modulation. The pump unit shown in FIG. 14 comprises laser driver electronics 221, laser diodes (light sources) 222 and 223 and a multiplexer 224. The laser driver electronics 221 supplies modulated current power to the laser diodes 222 and 223.

The laser diodes 222 generate pump lights with wavelengths $\lambda_1$ through $\lambda_n$ by the modulated current for n first-order pumps. The laser diodes 223 generate pump lights with wavelengths $\lambda_{n+1}$ through $\lambda_{n+m}$ by the modulated current for m second-order pumps. The laser driver electronics 221 operates as a modulator unit and controls the relative timing of the first- and second-order pumps.

The multiplexer 223 multiplexes and outputs the pump lights from the laser diodes 222 and 223. The pulse trains 225 and 226 represent typical pulse shapes of the first- and second-order pumps, respectively.

Figure 15:
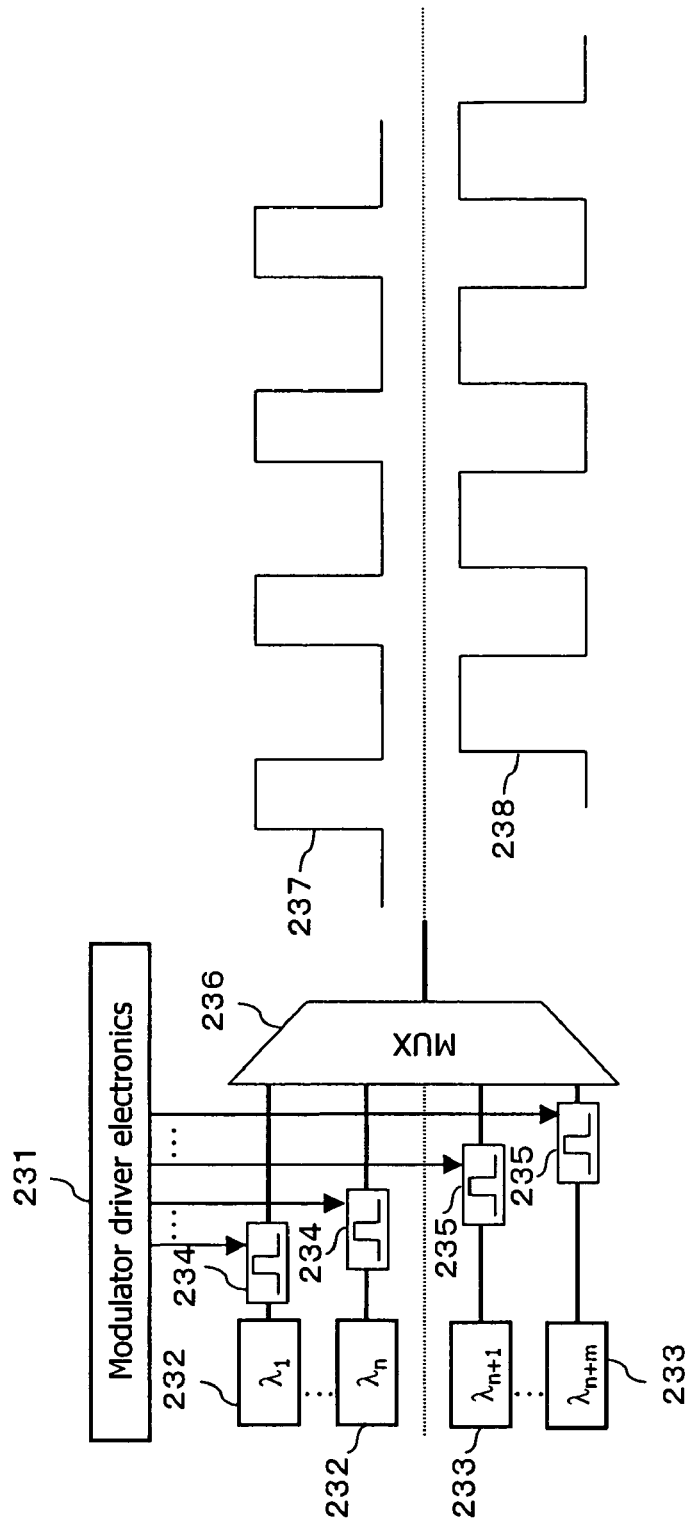
FIG. 15 shows the configuration of a pump unit employing optical modulation.

FIG. 15 shows the configuration of a pump unit employing optical modulation. The pump unit shown in FIG. 15 comprises modulator driver electronics 231, laser diodes 232 and 233, optical modulators 234 and 235 and a multiplexer 236.

The modulator driver electronics 231 supplies power to the optical modulators 234 and 235. The laser diodes 232 generate lights with wavelengths $\lambda_1$ through $\lambda_n$ and the laser diodes 233 generate lights with wavelengths $\lambda_{n+1}$ through $\lambda_{n+m}$.

The optical modulators 234 modulate the lights from the laser diodes 232 to generate pump lights of n first-order pumps. The optical modulators 235 modulate the lights from the laser diodes 233 to generate pump lights of m second-order pumps. The modulator driver electronics 231 and the optical modulators 234 and 235 operate as a modulator unit and control the relative timing of the first- and second-order pumps.

The multiplexer 236 multiplexes and outputs the pump lights from the optical modulators 234 and 235. The pulse trains 237 and 238 represent typical pulse shapes of the first- and second-order pumps, respectively.

In the configurations shown in FIGS. 14 and 15, the modulation frequency ranges from a few MHz to several hundred MHz, depending on the difference of the group velocities of the first- and second-order pumps, and the desired interaction length.

In addition, a continuous wave third-order pump light can be launched either in forward or in backward direction to compensate for absorption losses of the second-order pumps. The third-order pumping is employed to amplify the second-order pump light.

Figure 16:
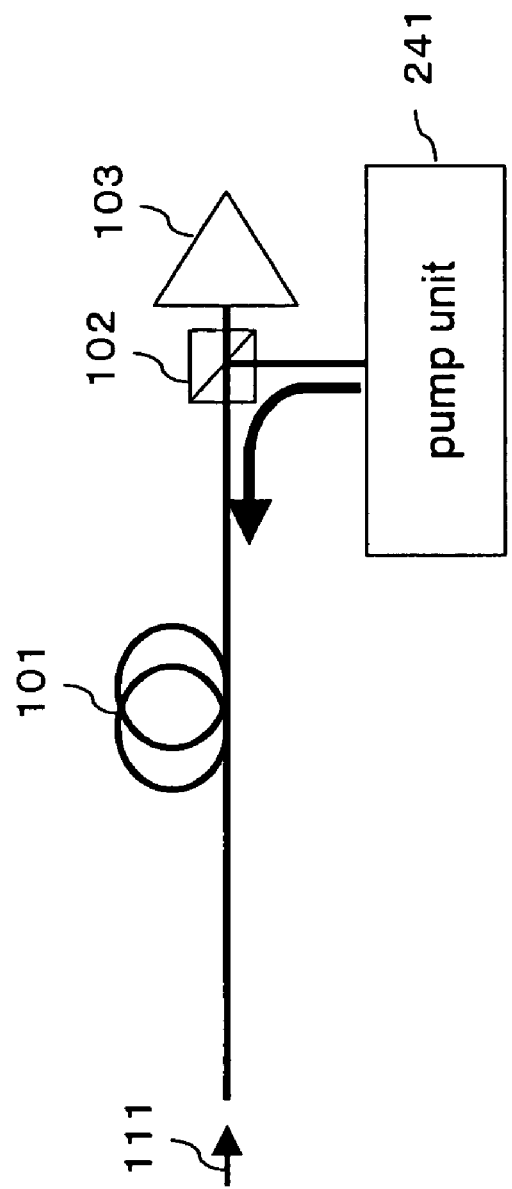
FIG. 16 shows a pumping concept with reverse third-order pumping.

In contrast to modulated first- and second-order reverse pumping without third-order pumping, which is shown in FIG. 6, FIGS. 16 and 17 show pumping concepts with reverse third-order pumping and with forward third-order pumping, respectively. The pump unit 241 in FIG. 16 generates the first-, second- and third-order pump light propagating in opposite direction to the signal light 111, whereas the pump unit 242 in FIG. 17 generates only the third-order pump light propagating in the same direction as the signal light 111.

The pump unit 241 can be realized, for example, by adding a laser diode for the continuous wave third-order pump to one of the configurations shown in FIGS. 14 and 15. The pump unit 242 also includes such a laser diode.

According to the third-order pumping scheme, the absorption loss experienced by the second-order pump is partly compensated by the amplification through the third-order pump. Thus, during the interaction between the second- and first-order pump pulses, the gain experienced by the first-order pump is larger. As a consequence, the signals also experience stronger gain in the interaction area.

Furthermore, the second-order pump light might be modulated such that the components overlapping with the first-order pumps deeper within the fiber have a higher launch power. In this case, temporal shapes of the first- and second-order pump pulses are controlled as the relative timing of the pumps. This technique can further help to equalize the gain induced by the first-order pumps along the fiber.

Figure 18:
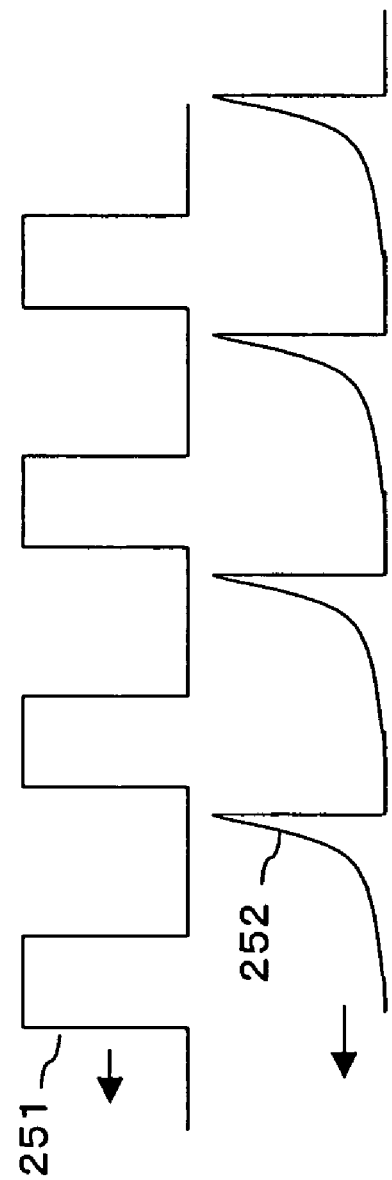
FIG. 18 shows pump pulse shapes for equalizing gain transfer from the second-order pump to the first-order pump.
Figure 19:
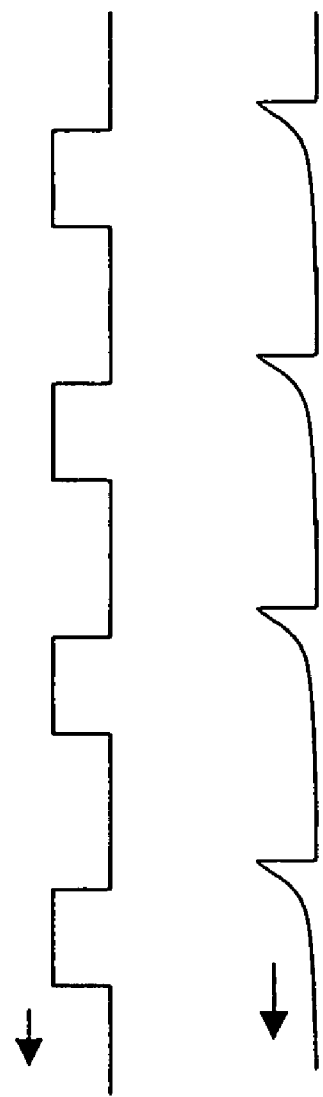
FIG. 19 shows pump pulse shapes in the interaction area.

FIG. 18 shows an example of the second-order pump pulse shape in such a modulation concept. The pulse trains 251 and 252 represent typical pulse shapes of the first- and second-order pumps, respectively, at the launching point of the pumps (t=0). In the interaction area (t=$t_1$, $t_1$>0), the pulse shapes change as shown in FIG. 19 due to the power absorption within the fiber.

If the pulse train 252 in FIG. 18 is used instead of the pulse train 226 in FIG. 14 or the pulse train 238 in FIG. 15, since the power of the second-order pump light increases from the starting point towards the ending point of the interaction area, the power transfer from the second- to the first-order pump is pushed deeper into the fiber.

The concept of the present invention can be applied not only to distributed Raman amplification but also to discrete fiber Raman amplifiers (e.g. Raman pumped dispersion compensating fibers or S-band fiber Raman amplifiers).

The invention claimed is:

1. An amplification system employing Raman amplification with a plurality of first-order Raman pumps and at least one second-order Raman pump which amplifies the first-order Raman pumps, the first- and second-order Raman pumps counter-propagating to signal light in an optical fiber, the amplification system comprising:

a plurality of light sources generating pump light of the first- and second-order pumps; and a modulator unit modulating the pump light of the first- and second-order pumps such that pump power of modulated pulses of the at least one second-order pump does not overlap with pump power of modulated pulses of the first-order pumps at a launching point of the pump light in the optical fiber, and such that pump power of modulated pulses of the at least one second-order pump overlaps with pump power of modulated pulses of the first-order pumps at a position distant from the launching point, by using a first timing for the pump light of the first-order pumps and a second timing relatively different from the first timing for the pump light of the at least one second-order pump to allow flattening lateral signal power distribution along the optical fiber.

2. The amplification system according to claim 1, further comprising a light source generating pump light of at least one third-order pump co-propagating with the signal light to amplify the second-order pump.

3. The amplification system according to claim 1, further comprising a light source generating pump light of at least one third-order pump co-propagating with the second-order pump to amplify the second-order pump.

4. The amplification system according to claim 1, wherein the modulator unit controls a temporal shape of modulated pulses of the second-order pump such that pump power of the modulated pulses of the second-order pump overlap with pump power of modulated pulses of the first-order pumps.

5. The amplification system according to claim 4, wherein the modulator unit controls the temporal shape of the pulses such that power transfer from the second-order pump to the first-order pumps is pushed deeper into the optical fiber.

6. The amplification system according to claim 1, wherein the modulator unit includes driver electronics controlling the first and the second timing and electrically modulates the pump light of the first- and second-order pumps through the driver electronics.

7. The amplification system according to claim 1, wherein the modulator unit includes optical modulators controlling the first and the second timing and optically modulates the pump light of the first- and second-order pumps through the optical modulators.

8. An amplification method employing Raman amplification with a plurality of first-order Raman pumps and at least one second-order Raman pump which amplifies the first-order Raman pumps, the first- and second-order Raman pumps counter-propagating to signal light in an optical fiber, the amplification method comprising:

generating pump light of the first- and second-order Raman pumps;

modulating the pump light of the first- and second-order Raman pumps by using a first timing for the pump light of the first-order pumps and a second timing different from the first timing for the light pumped of the at least one second-order pump to allow flattening lateral signal power distribution along the optical fiber; and launching the pump light of the first- and second-order pumps in opposite direction to the signal light in the optical fiber, wherein pump power of modulated pulses of the at least one second-order pump does not overlap with pump power of modulated pulses of the first-order pumps at a launching point of the pump light in the optical fiber, and pump power of modulated pulses of the at least one second-order pump overlaps with pump power of modulated pulses of the first-order pumps at a position distant from the launching point.

9. A Raman amplification method in an optical fiber, comprising:

emitting pump light of a plurality of first-order Raman pumps and at least one second-order Raman pump, first-order pump lights having different time offset between the pump light of the first-order Raman pump and the pump light of the at least one second-order Raman pump, and different launching powers correlated to equalize a gain induced by the plurality of first order pumps along the fiber, wherein pump light pulses emitted by the at least one second-order pump do not overlap with pump pulses emitted by the first-order pumps at a launching point of the pump light in the optical fiber, and pump light pulses emitted by the at least one second-order pump overlap with pump light pulses of the first-order pumps at a position distant from the launching point.

* * * * *

UNITED STATES PATENT AND TRADEMARK OFFICE
CERTIFICATE OF CORRECTION

| | | |
|---|---|---|
| PATENT NO. | : 7,477,446 B2 | Page 1 of 1 |
| APPLICATION NO. | : 10/530049 | |
| DATED | : January 13, 2009 | |
| INVENTOR(S) | : Rainer Hainberger | |

It is certified that error appears in the above-identified patent and that said Letters Patent is hereby corrected as shown below:

Title Pg. Item (75) (Inventors), Line 1, change "Vienna" to --Wien--.

Signed and Sealed this

Seventh Day of April, 2009

JOHN DOLL
*Acting Director of the United States Patent and Trademark Office*